Patented Oct. 16, 1928.

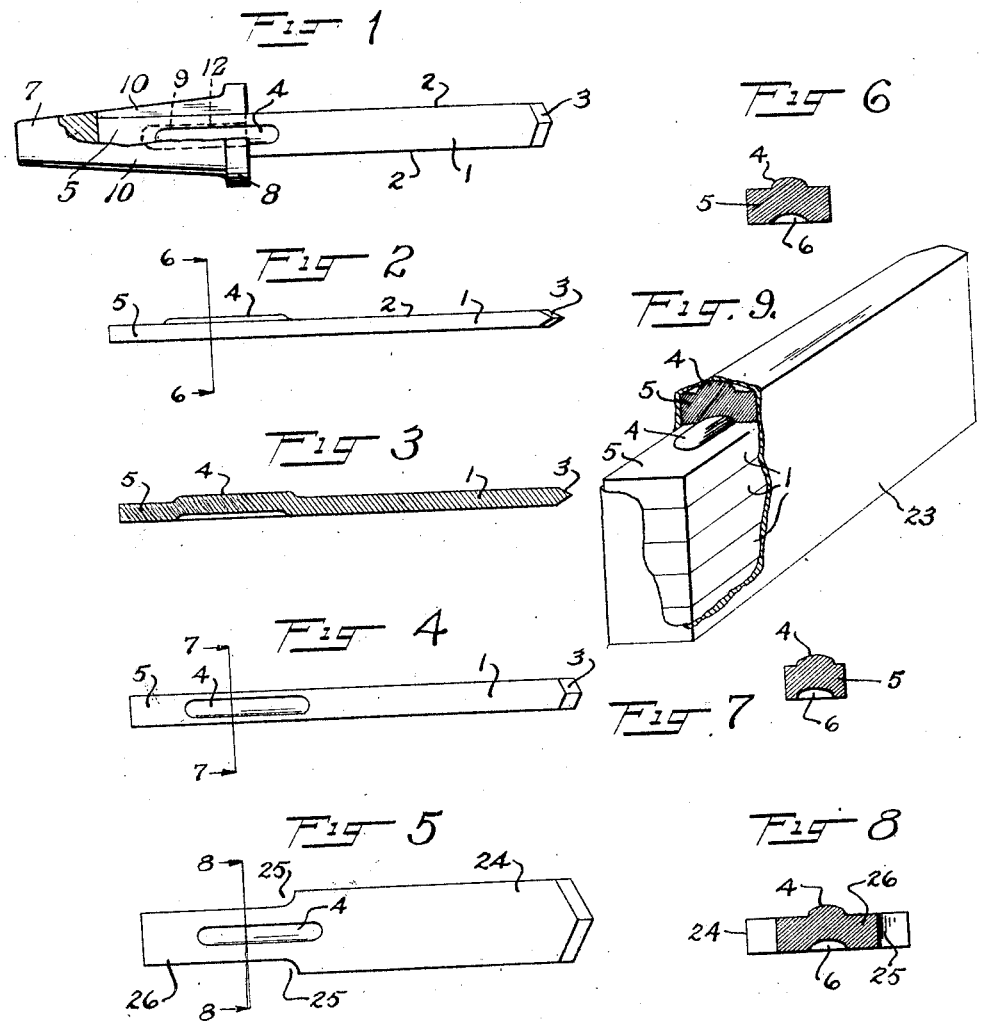

1,688,153

UNITED STATES PATENT OFFICE.

HENRY W. PLEISTER, OF WESTFIELD, NEW JERSEY, ASSIGNOR, BY MESNE ASSIGNMENTS, TO HENRY B. NEWHALL CORPORATION, OF GARWOOD, NEW JERSEY, A CORPORATION OF NEW JERSEY.

DRILL BLADE.

Application filed November 7, 1925. Serial No. 67,501.

My invention relates to drills for use in the stone working art and more particularly to a drill blade made from relatively thin flat bar steel, at such a small cost that it is cheaper to discard the drill blade when dull, and use a new one, than to sharpen the old one.

This application is the original application from which the divisional application, Ser. No. 97,835, now Patent No. 1,628,684, patented May 17, 1927, was divided.

In the drawings the same reference numerals refer to similar parts in the several figures.

Fig. 1 is a plan view of one of my drill blades formed from relatively thin flat bar steel shown in connection with a drill blade holder broken away for purposes of illustration;

Fig. 2 is a side elevation of the blade shown in Fig. 1;

Fig. 3 is a longitudinal section;

Fig. 4 is a plan view of a blade, similar to Fig. 1, but narrower;

Fig. 5 is a plan view of a modified form of a drill blade, in which the shank is smaller than the other portion of the blade, so as to cooperate with a blade holder of a given size;

Fig. 6 is a transverse vertical section on line 6—6 of Fig. 2;

Fig. 7 is a transverse vertical section on the line 7—7 of Fig. 4;

Fig. 8 is a transverse vertical section on the line 8—8 of Fig. 5;

Fig. 9 is a side elevation showing the manner of forming a package of nested blades.

Prior to my invention, drill points for use in the stone working art were commonly made tapered by suitable dies in forging machines. Where the sides of the dies came together some of the metal of the forging was forced between the dies, forming a web which was known as "flashing". These "flashings" had to be removed from the forging, which was commonly known as trimming or cutting off. All this was expensive in labor and the loss of material in the form of scrap. The resulting cost of the drill points was such that after they became dulled in use it was much more economical to have them repeatedly sharpened than to discard them and use a new drill point.

By my invention I make a drill point for use in the stone working art, in the form of a drill blade, from relatively thin flat bar steel at such a low cost that when they become dulled in use, it is more economical to discard the dull drill blade, and use a new one, rather than have the old one sharpened. A plurality of my drill blades can be nested together to form a package, which can be taken by the mechanic to the job for replacements, as soon as a drill blade becomes dull. In this manner a mechanic, in a given time, can do better and quicker work for he will always have a sharp drill to work with.

These drill blades can be quickly located in a drill holder, the drill holder being adapted to cooperate with a drill member; this drill member may be a handle of a hand operated drill, or a part of a power operated drill.

In the preferred form of my invention shown in the drawings, 1 is a drill blade formed from flat bar steel, having parallel sides 2, 2, a point 3 and preferably a strengthening rib or key 4 made by embossing the metal of the shank 5 of the blade. This forms a groove 6 on the opposite side of the blade from the strengthening rib or key 4. These blades may be made by hand, but are preferably made by feeding a bar of steel of the required width and thickness of the blade 1, into a punch press, where cutting the bar into the proper length for a blade, forming the point 3, and the embossed strengthening rib or key 4, is all done in one operation. When a sufficient quantity of these blades have been formed by the punch press, they are then tempered in mass so as to give them the proper temper.

It will be noted that as the bar steel is flat, and has parallel sides and is of the same thickness and width of blade 1, there will be no flashing and consequently no trimming to remove such flashing.

The length of the strengthening or embossed rib 4 may vary, being relatively long on the blades shown in Figs. 1, 2 and 3, and shorter on the blade shown in Figs. 4 and 5. This embossed rib also performs the function of a key to properly seat the blade in the conical blade holder 7.

This conical blade holder 7 is provided with the flange 8, with an axial bore 9 for part of its length, and with the two spring jaws 10, 10, each jaw having a portion of the axial bore 9 which form key slots 12, 12 to cooperate with the embossed strengthening rib or key 4 on the drill blades 1. In placing the drill blade within the drill holder 7, one of these key slots 12 will immediately cooperate with the embossed key 4 and center the drill blade 1 within the drill holder 7. This will be true of all widths of blade within the range of the particular size drill holder 7, it, of course, being understood that different sizes of drill blades 1 may be used with a given size of drill holder 7.

The drill holder and drill blade (Fig. 2) is then placed in the cooperating drill member adapted to receive it. This drill member may be a handle, for a hand operated drill, or it may be any suitable part of a power drill.

After the point 3 of the drill blade 1 has become dulled, and it is desired to throw away that drill point, a new drill blade may be taken, for example, from the package 23, and be placed in the drill blade holder 7, and that member be again repositioned in the drill handle in the manner previously described.

By forming the drill blades flat with parallel sides and with an embossed strengthening rib or key 4, forming the groove 6 on the other side of the blade, a plurality of the drill blades can be readily nested, a rib or key of one blade being seated in the groove of the adjacent blade, so that a package 23 of a plurality of these drill blades can be readily made and easily carried in the pocket of the mechanic, ready for instant use when desired.

In Figs. 5 and 8, I have shown a modification of my invention in which the bar of steel from which the drill blade 24 has been formed, is cut away at 25, 25 to form a reduced shank 26 in which the embossed rib or key 4 is formed. This shank 26 can be used with the same drill blade holder 7 as will receive the drill blades shown in Figs. 1 to 4, and it will be centered by the key 4 co-operating with one of the key slots 12. Preferably I use the drill holder 7 for many different widths of drill blades, which can be accommodated between the jaws 10, 10 without cutting away any of the metal of the drill blade; though this may be done as shown in Figs. 5 and 8, in which case a wider range of widths of drills may be employed in the same drill holder 7.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising a flat drill blade for use in the stone working art having an integral projecting strengthening rib and a corresponding groove on the opposite side of the drill part of the rib being between the chuck or drill holder and the end of the drill blade, the strengthening rib adapted to also act as a key.

2. A plurality of flat drill blades for use in the stone working art each having an integral projecting strengthening rib and a corresponding groove on the opposite side of the drill, part of the strengthening rib being between a co-operating chuck or drill holder and the end of the drill blade and adapted to act as a key in the chuck and to also co-operate with a groove in another drill blade so that two or more of said drill blades may be nested in stack relation.

3. A new article of manufacture comprising a package of a plurality of nested flat drill blades for use in the stone working art having embossed strengthening ribs forming grooves on the opposite side of the blade, part of the strengthening rib being located between a co-operating chuck or drill holder and the end of the drill blade, one blade nesting in the groove of the next blade.

4. A new article of manufacture comprising a relatively thin flat drill blade for use in the stone working art formed from a cold rolled strip of relatively thin steel of the same contour as the thin blade, the end of the blade being sharpened and tempered, the shank of the blade being provided with an embossed strengthening rib on one side struck up from the metal of the blade and forming a longitudinal groove on the other side, part of the strengthening rib being located between a co-operating chuck or drill holder and the end of the drill blade.

HENRY W. PLEISTER.